Oct. 27, 1959      C. L. HASTINGS      2,910,037
MECHANICAL TACHOMETER

Filed April 10, 1957      3 Sheets-Sheet 1

INVENTOR.
CLARK L. HASTINGS
BY
ATTORNEY

Oct. 27, 1959     C. L. HASTINGS     2,910,037
MECHANICAL TACHOMETER
Filed April 10, 1957     3 Sheets-Sheet 2

United States Patent Office 2,910,037
Patented Oct. 27, 1959

2,910,037

MECHANICAL TACHOMETER

Clark L. Hastings, Rochester, N.Y., assignor to Rochester Manufacturing Company, Inc., Rochester, N.Y., a corporation of New York Application April 10, 1957, Serial No. 651,930

8 Claims. (Cl. 116—57)

This invention relates to a combination gauge and more particularly to a combination tachometer and speedometer for tractors.

On a farm tractor, there are frequently a multiplicity of separate gears, and in addition, a power take-off device. The engine must be operated at a gear ratio that is suitable for the work being done. For proper control of the engine operation, the ground speed and the engine speed each must be known.

For this purpose, conventional tractor speedometer gauges of the rotary pointer type have dials that are provided with a plurality of concentric differently colored circular areas, each area indicating a different gear. Ordinarily, revolutions per minute are indicated on one half of such a dial face, while engine speed is indicated on the opposite half of the dial face. Such gauges are difficult to read, easily produce confusion, and frequently lead to error in the operation of the engine that may result in damage to the engine.

Recently, gauges of somewhat improved readability have been introduced in which two drums are mounted one above the other, on parallel, vertically-spaced axes in a casing. The casing is formed with a slot that is disposed to extend axially, between the drums. An engine speed scale is disposed on the casing below the slot. The upper drum carries on its outer surface several axially-extending scales, each scale representing speed in miles per hour for a certain indicated gear. This drum is mounted to be manually rotatable, so that it can be adjusted to expose, through the slot in the casing, a selected scale.

The lower drum is rotatably mounted to be driven from the engine by a conventional drive, that is determined by the engine speed, and the ground speed. The lower drum has a helical line on its outer surface. The portion of the helical line on the lower drum exposed through the slot in the casing registers with the selected scale of the upper drum, and indicates ground speed on the scale, and also registers with the engine speed scale on the casing to indicate the engine speed.

This type of gauge eliminates much of the prior opportunity for confusion since only a single ground speed scale is exposed to view at any one time. However, it is still necessary for the tractor operator to shift his eyes between the widely-spaced ground speed and engine speed scales in order to determine both the ground speed and th engine speed. In addition, the superposed drum construction necessarily involves a gauge design that is bulky and that has many moving parts.

An object of the present invention is to provide a combination gauge to indicate ground speed and engine speed of an engine simultaneously, by a single, simple, direct reading, which gauge will nevertheless be simple and inexpensive of construction.

Another object of the invention is to provide an instrument of the character described in which there is also incorporated an odometer so as to enable the operator of the tractor to determine approximately the hours of operation of the engine, and thus to know when the tractor, including the engine, requires servicing.

Another object of the invention is to provide a double drum, combination gauge that is of small, compact, lightweight, rugged construction, and that has a minimum number of parts.

A related object of the invention is to provide a double drum combination gauge that is easy to operate.

Still another object of the invention is to provide a combination gauge that is resistant to vibration, exposure to the elements, and infiltration of dirt.

Other objects of the invention will become apparent from a consideration of the following description of one embodiment of the invention that is illustrated in the drawings.

In the illustrated embodiment of the invention, a pair of drums are mounted concentrically of one another on a horizontal axis, in radially spaced relation, in a casing. The casing has an elongate aperture that extends axially with respect to the drums, and an engine speed scale is permanently mounted on the casing above this aperture.

The outer drum has a plurality of angularly spaced, axially-extending scales disposed on the outer surface thereof, and is formed with an axially-extending slot adjacent each scale. The different scales of the outer drum are calibrated in ground speed miles per hour to correspond, respectively, to the different gears in which the engine is operated. The outer drum is mounted for manual adjustment, so the operator can index the outer drum relative to the casing, to bring the proper scale and its associated slot, corresponding to the gear employed, into registration with the aperture in the casing.

A helical line is disposed on the outer surface of the inner drum to be visible from the outside of the casing through the aperture in the casing and through the slot in the outer drum that is registered with the aperture in the casing. The inner drum is adapted to be driven by a magnetic drive in proportion to the engine speed. A hairspring, which is interposed between the inner drum and the casing, constantly urges the inner drum to zero position.

An odometer is mounted in the casing and is driven proportionally with the inner drum. This may be graduated to indicate the hours of operation of the engine. It is readable through an aperture in the casing.

For operation, the outer drum is first adjusted manually to index it relative to the casing, to bring the proper scale and its associated slot, corresponding to the tractor gear that is in use, into registration with the aperture in the casing. In use, the inner drum is rotated by its magnetic drive through an angle that is determined by the engine and ground speed; and the portion of the helical line on the inner drum that is exposed through the selected slot in the outer drum and through the associated aperture in the casing then registers against both the engine speed scale on the casing and against the selected ground speed scale on the outer drum, to indicate engine speed and ground speed simultaneously. As the inner drum rotates, the odometer or hour meter rotates, also, indicating the hours of operation of the vehicle.

The details of the construction of the invention may be best understood from the following detailed description of the illustrated embodiment of the invention.

Referring now in detail to the drawings, the gauge casing 10 includes a front mounting plate 11 having four mounting bosses 12 by which the casing can be secured to a tractor dashboard. The casing 10 is formed with a pair of superposed front vertical, rectangular faces 13, 14, that are disposed forwardly of the mounting plate 11.

Figure 4:
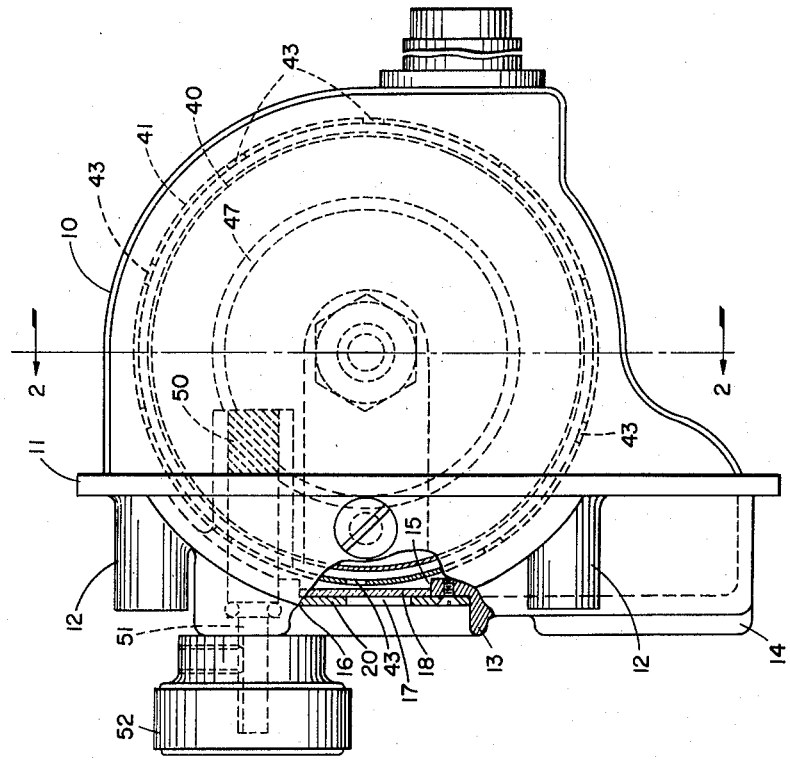
Fig. 4 is a right side elevation thereof, referring to Fig. 1, partly broken away to show the relation between the aperture in the casing, a selected scale and slot of the outer drum, and the surface of the inner drum.

The upper face 13 is formed with an elongate, generally rectangular opening 15 (Fig. 4). A scale plate 16 is removably secured across the opening 15 in the face 13, and is formed with an elongate aperture 17. A scale 20, graduated in hundreds of revolutions per minute, is permanently etched on the front face of the plate 16, above the elongate aperture 17. A flat plate 18 of glass or transparent plastic is secured to the casing across the aperture 17 to seal off the interior of the casing.

The casing 10 is formed on its interior with axially-aligned mounting means to support a pair of drums. One of the mounting means is a stud 21 (Fig. 2) that is rigidly secured to one side of the casing. The rod 21 is formed with an enlarged collar 22 that has a reduced extension that terminates in a centering point 23. A gear 24 is mounted on the stud 21 to rotate freely thereon. A bar magnet 25 is secured to the hub of the gear 24 to rotate upon rotation of the gear 24; and a temperature-compensating bar 28 is secured to this bar magnet to insure uniformity of action of the magnet regardless of temperature. The gear 24 is mounted to be driven by a gear 26 that is fixedly secured to drive shaft 27 to rotate upon rotation of the drive shaft 27. The drive shaft 27 is extended out of the casing 10 to be connected to a convenient take off point on the tractor engine.

The second mounting means, that is axially aligned with the stud 21, comprises a conically-indented plug 30 that is threaded into a bushing 31 that is rigidly secured on the opposite side of the casing 10. A nut 32 is threaded in the bore of the bushing 31 behind the first plug 30 to lock it in place. The bushing 31 is formed at its inner end with a flange 33 and a step 34. A spacer ring 35 is mounted on the bushing 31 abutting against the step 34, and a smaller washer 36 is mounted on the bushing 31 between the spacer ring 35 and the casing 10.

An inner drum 40 and an outer drum 41 are mounted concentrically within the casing 10. The drums 40, 41, are mounted close to each other, and the surface of the outer drum 41 is spaced close to the aperture 17 in the scale plate 16.

The outer drum 41 is formed with a plurality of angularly spaced, axially-extending scales 42 disposed on the outer surface thereof. Each scale is graduated to indicate miles per hour, and the scales are calibrated to correspond to the speed in the several gears in which the engine can be operated. The drum 41 is also formed with a slot 43 adjacent each scale, and each slot 43 is disposed to be visible above its associated scale when viewed through the aperture 17 at the face 13 of the casing.

The outer drum 41 is closed at each end. At one end, the drum is closed by a cup-shaped member, and this member is rotatably mounted on the reduced end of the stud 21. The bar magnet 25 is disposed to rotate in the recess of the cup-shaped end member 44. At its opposite end, the outer drum 41 is closed by an end plate 45 that is formed with a central recessed portion 46. A face gear 47 is formed around the circumference of the recessed portion 46. The recessed portion 46 is centrally apertured and is mounted for free rotation on the step 34 of the bushing 31.

Figure 3:
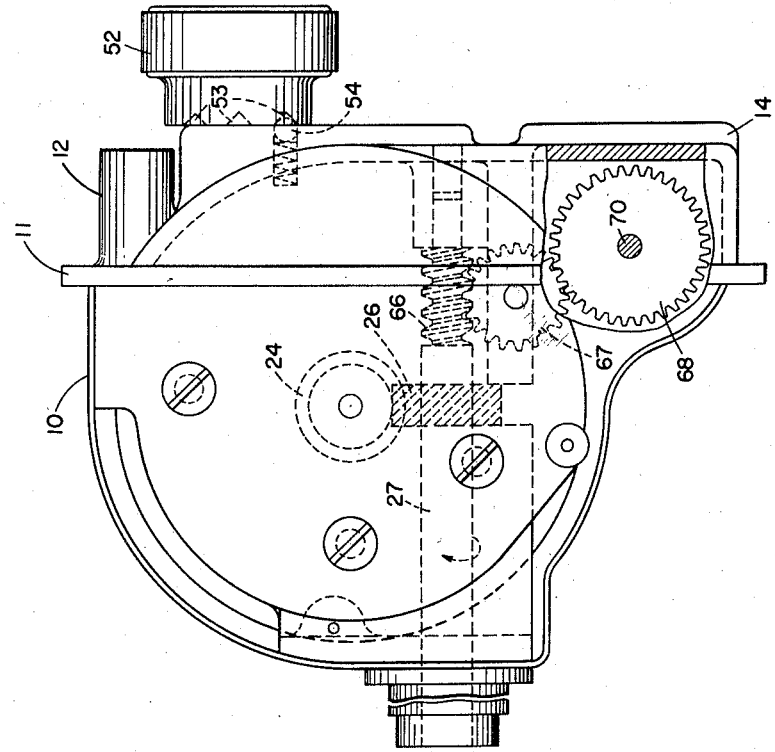
Fig. 3 is a left side elevation thereof, referring to Fig. 1.

A helical pinion 50 is mounted on a shaft 51, to mesh with the face gear 47. The shaft 51 projects from the casing, and a knob 52 is secured on its projecting end. The inner surface of the knob is formed with a plurality of circumferentially-arranged notches 53 (Fig. 3) and a spring-pressed ball detent 54 (Fig. 3) is mounted in the casing to engage the notches to hold the drum in any adjusted position. To index the outer drum 41 relative to the casing 10, to bring a selected scale 42 and slot 43 into registry with the aperture 17, the knob 54 is rotated to turn the helical pinion 50 and face gear 47.

Figure 2:
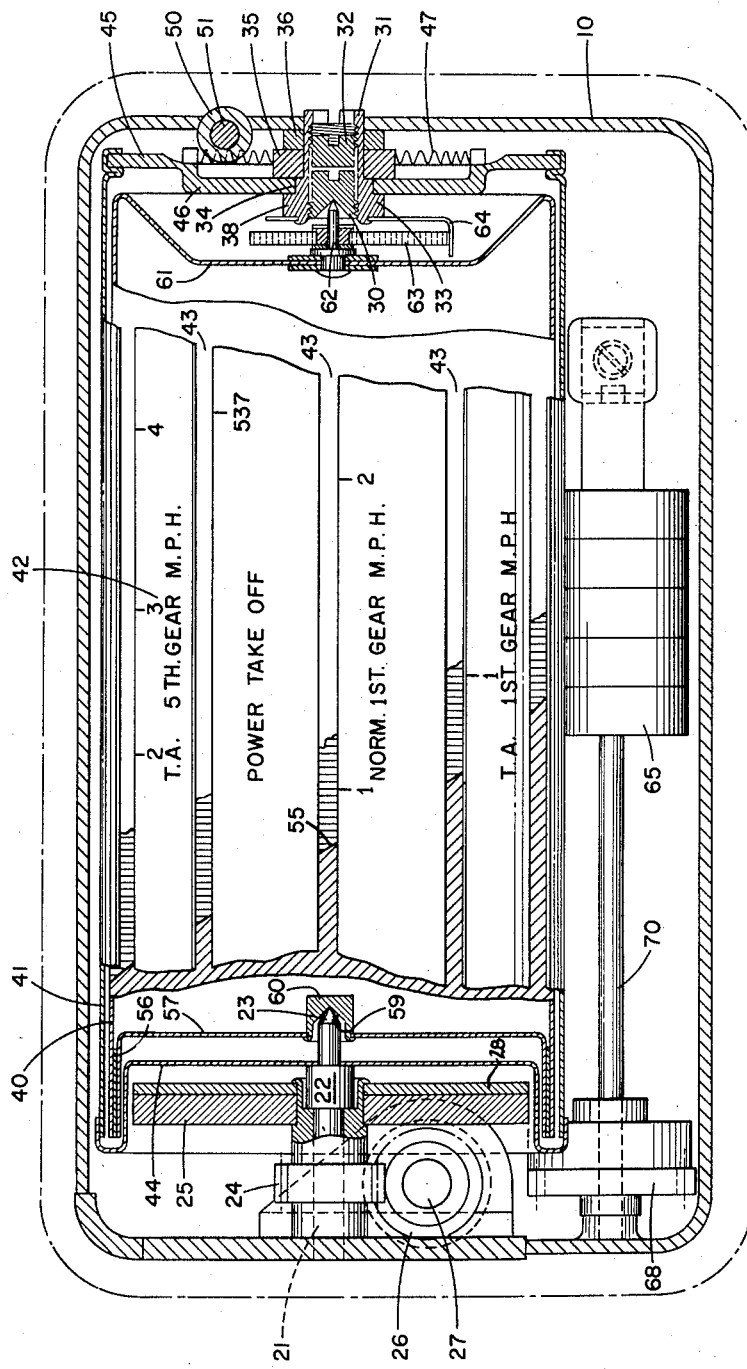
Fig. 2 is a front elevation thereof with the front of the casing removed and with parts of both drums broken away.

The surface of the inner drum 40 is formed with a helical indicating line 55. This line may be rendered clearly visible by forming the areas on each side of the line with contrasting colors, as indicated in Fig. 2.

The inner drum 40 is also closed at each end. At one end, a paramagnetic cylindrical ring 56 is inserted in the end of the drum 40, and a cup-shaped member 47 is inserted within the ring 56, to close the drum at that end. The overlapped portions of the drum 40, ring 56, and member 57 are riveted or pressed together in a conventional manner. The assembly thus formed and the cup-shaped end member of the outer drum are so proportioned that the inner drum assembly nests over the corresponding part of the outer drum, as shown in Fig. 2. Thus, the paramagnetic ring 56 is mounted in close proximity to the ends of the magnet 25. A block 60 is centrally mounted on the cup-shaped member 57 and is formed with a conical recess whose apex is aligned with the axis of the inner drum 40, to receive the centering point 23 of the fixed stud 21.

At its opposite end, the inner drum 40 is formed with an integral dished end plate 61. A center 62 is secured on the end plate 61 in axial alignment with the inner drum 40, and engages in the conical indentation in the plug 30. A hairspring 63 is interposed between the end wall 61 of the inner drum 40 and the end wall 45 of the outer drum 41, to resist the torque applied to the drum 40 by rotation of the magnet 25 and to return the drum 40 to zero position. The spring 63 is secured at one end to the rod 62, and at its other end to the arm of an L-shaped bracket 64 that is rigidly secured to the bushing 30.

Figure 1:
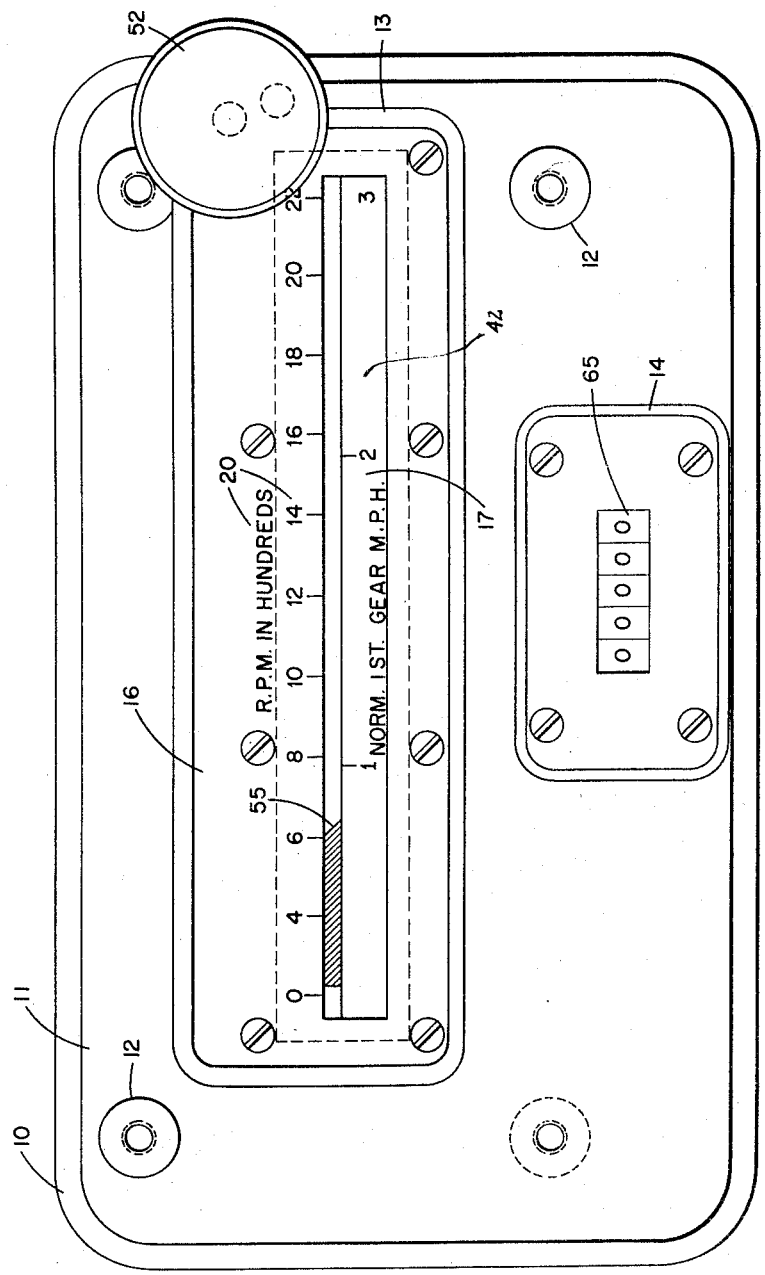
Fig. 1 is a front elevation of a gauge constructed according to one embodiment of this invention and shown in a typical operating position.

An hour meter 65 of conventional type is also mounted in the casing 10. The odometer is mounted to be driven from the drive shaft 27 through a gear train including a worm 66 (Fig. 3) that is integral with the shaft 27, a wormwheel (not shown), a gear 67 secured to rotate with the wormwheel, and a gear 68 that is mounted on a shaft 70. The shaft 70 drives conventional odometer recording mechanism that is mounted to be visible through an aperture in the face 14 of the casing, as shown in Fig. 1. The drive shaft 27 is operatively connected to a convenient take off point on the tractor engine.

In operation, the knob 52 is rotated to index the outer drum 41, to bring the proper scale 42 and its associated slot 43 into registry with the aperture 17 at the face 13 of the casing. The scale 42 and its associated slot 43, that are registered with the aperture 17, should correspond to the gear in which the engine is to be operated. The notches 53 on the undersurface of the knob 52 are so disposed around the undersurface of the knob as to hold the knob and the outer drum 41 at the fixed positions that correspond to proper registration of each scale 42 and its associated slot 43 with the aperture 17.

As the tractor engine is operated, the drive shaft 27 is rotated, and it drives the gear 26, the pinion 24, and the magnet 25. As the magnet 25 is driven, it exerts a torque on the paramagnetic cylindrical ring 56, and thus causes the inner drum 40 to rotate to cause the line 55 to register against the scale 42, which is in position at the aperture 17 and also to register against the scale 20. This also winds the hairspring 63. Preferably, the drive is designed so that the angular rotation of the inner drum 40, that is caused by the torque exerted by the rotating magnet 25, is proportional to the speed of the drive shaft 27 and of the engine.

As the drum 40 rotates, the portion of the helical indicating line 55 that is visible through the aperture 17 of the casing face 13, moves laterally in the slot 17 and in the slot 43 that is registered with the aperture 17. The portion of the helical line 55, that is visible, will progress along the scale 42, and along the scale 20, in increments that are proportional to the angular rotation of the drum 40. The differently colored areas on each side of the line 55 render the exact position of the line readily visible.

As can best be seen in Fig. 1, the engine speed in hundreds of revolutions per minute, can be read from the engine speed scale 20 that is disposed on the plate 16 immediately above the aperture 17. At the same time, the ground speed can be observed, in miles per hour, from the scale 42 that is disposed on the surface of the outer drum 41 and that is exposed through the aperture 17, at the face 13 of the casing.

When the tractor engine is to be operated in another gear, the control knob 52 is turned manually, to bring the appropriate scale 42 and slot 43 into registry with the aperture 17.

When the drive shaft 27 is rotated, the worm 66 is driven to rotate the wormwheel (not shown) and the gear 67, the gear 68, and the shaft 70, to drive the odometer mechanism 65.

There is thus provided a gauge construction that will fulfill each and all of the objects of the invention. Engine and ground speed can be observed with a single glance, easily and distinctly, and free from the confusion that ordinarily occurs when conventional tachometers are used. The gauge structure is small, compact, and light-weight. Compared to other gauges, there are comparatively few parts. Moreover, since the outer drum can be rotated in either direction to index it, the gauge is functionally convenient for the operator. Furthermore, since an hour meter is mounted within the casing, the operator of the vehicle can readily determine when the engine or other parts of the vehicle need servicing.

While a specific gauge construction has been described and illustrated, it will be appreciated that many variations from the described and illustrated structure will occur to those skilled in the art that are nevertheless within the scope of the invention. For example, while ordinarily it is contemplated that the gauge will be mounted on the dashboard of a vehicle, in its casing 10, the gauge may be mounted in any suitable housing and on any suitable support. Preferably, however, the casing should be so constructed that the gauge is completely sealed against dust, water, ice and mud, by the use of gaskets at the appropriate points. Preferably, the gauge is sealed so that it is tight against air leakage under water, so that it can withstand the effects of exposure to the weather.

In general, it is preferred that light-weight metal be used wherever practical in order to minimize vibration problems. However, the several shafts, bearings, and bearing supports should be designed for heavy-duty use. The several scales preferably should be etched or otherwise printed directly on the underlying surfaces, in order to avoid deterioration that may occur with age and exposure if paper scales are employed.

Similarly, the magnetic drive described is of the conventional type in which the inner drum 40 is driven through equal angles for equal increments of rotational speed of the drive shaft 27. However, other drives are available in which the cylinder rotates by angular increments that are not directly proportional to equal changes in rotational speed of the drive shaft 27. Such drives require the use of an indicating line other than helical, or alternatively, special calibration of the several scales that indicate the ground speed and engine speed.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A tachometer for indicating speeds of a vehicle engine comprising a casing, a first rotary drum rotatably mounted therein and having indicating indicia on the outer surface thereof, said casing having an elongate aperture therein extending axially of said drum, an engine speed scale mounted on said casing along one axially-extending edge of said aperture, spring means interposed between said drum and said casing constantly to urge said drum to a null position, means driven by the engine for rotating said drum in opposition to said spring means, a second rotary drum mounted around said first drum coaxially therewith in radially spaced relation thereto and interposed between said first drum and said casing, said second drum having a plurality of differently graduated scales each extending axially thereof and each being graduated in accordance with a particular engine-to-ground wheel speed ratio of the vehicle, the last-named scales being spaced from one another angularly about the axis of said second drum, said second drum having a slot adjacent each of its scales, and means to adjust said second drum to move a selected one of its scales and its adjacent slot into registry with said aperture, whereby the ground speed of the vehicle may be measured by observing the position of said indicating indicia on the first drum against said selected scale and the engine speed may be determined by observing the position of said indicating indicia on the inner drum against said engine speed scale along the edge of said aperture through said aperture and through said slot.

2. A tachometer for automotive vehicles, comprising a casing, a first drum rotatably mounted in said casing and having a helical indicating line on its periphery coaxial with said drum, a hollow second drum rotatably mounted in said casing surrounding said first drum and coaxial therewith, said second drum having a plurality of elongate slots therethrough which extend axially of said second drum and which are spaced angularly from one another about the axis of said second drum, said second drum having a plurality of scales on its periphery which are spaced angularly from one another about the axis of said second drum and which extend, respectively, along one edge of each of the slots of said second drum, said scales being graduated for different engine-to-ground speeds at which the vehicle may be driven in different gears, said casing having an elongate window therein and having a speed scale graduated in engine speed extending along one edge of said window, means for adjusting said second drum about its axis to bring a selected one of its scales and the slot associated therewith into registry with said window and means for driving said first drum from said engine whereby the position of said helical indicating line may be observed through said window and through said associated slot and read against the selected ground speed scale and against said speed scale.

3. A gauge comprising a casing having an elongate window therein, a first rotary drum rotatable in said casing and having a helical indicating line around its periphery coaxial with the drum, a second rotary drum surrounding said first drum and mounted coaxial therewith and rotatably adjustable relative thereto, said second drum being hollow and having a plurality of angularly-spaced, elongate, axially-extending slots therethrough, and said second drum having a plurality of graduated scales on its periphery each extending axially thereof along one edge of a slot, said scales being differently graduated, means for rotatably adjusting said second drum to bring selectively any of its slots and the scale associated therewith into registry with said window, and means for rotating said first drum in response to an outside stimulus, whereby the amount of said stimulus may be measured by observing said indicating line against the selected scale which is in registry with said window.

4. A gauge comprising a casing having an elongate window therein extending axially of the drum and having graduations along one axially-extending edge of said window, a first rotary drum rotatably mounted therein and having a helical indicating line around its periphery coaxial with the drum, a second rotary drum journaled in said casing, said second drum surrounding said first drum and being coaxial therewith and rotatably adjustable relative thereto, said second drum having a plurality of axially-extending slots therethrough which are spaced from one another angularly about the axis of said second drum, said second drum having also a plurality of differently-graduated scales which extend axially of said second drum and which are spaced from one another angularly about the axis of said second drum and which are arranged, respectively, along axially-extending edges of the several slots, means for rotatably adjusting said second drum about its axis to bring a selected one of said scales and the slot associated therewith into registry with said window, and means for driving said first drum in response to an outside stimulus to cause said indicating line to indicate the amount of said stimulus simultaneously on said selected scale and on the first-named graduations.

5. A gauge for measuring stimuli comprising a casing, a rotary drum mounted therein and having indicating indicia on the outer surface thereof, said casing having an elongate aperture therein extending axially of said drum, a member interposed between said casing and said drum and manually adjustable about the axis of said drum, said member having a plurality of graduated scales, each extending axially of said drum, said scales being differently graduated and being spaced from one another angularly about the axis of said drum, said member having an axially-extending slot adjacent each of said scales through which said indicating indicia may be viewed, and drive means connected to an outside actuating member to rotate said drum through a predetermined angle in response to a measurable stimulus originating from said actuating member, whereby said stimulus may be measured by observing said indicia against a selected one of said scales through its adjacent slot.

6. A gauge for measuring stimuli comprising a rotary first drum having a helical indicating line on the outer surface thereof coaxial with said drum, a second rotary drum mounted around said first drum, coaxially therewith and manually adjustable relative thereto about its axis, said second drum having a plurality of graduated scales, each extending axially thereof, said scales being differently graduated and being spaced from one another angularly about the axis of said drums, said second drum having an axially-extending slot therethrough adjacent each of said scales through which said indicating line may be viewed, and drive means connected to an actuating member to rotate said first drum through a predetermined angle in response to a measurable stimulus originating from said actuating member, whereby said stimulus may be measured by observing said indicating line against a selected one of said scales through its adjacent slot.

7. A gauge for measuring stimuli comprising a casing, a first rotary drum mounted therein and having indicating indicia on the outer surface thereof, said casing having an elongate aperture therein extending axially of said drum, a second rotary drum mounted around said first drum coaxially therewith and interposed between said first drum and the casing, said second drum having a plurality of graduated scales, each extending axially thereof, said scales being differently graduated and being spaced from one another angularly about the axis of said drum, said second drum having an axially-extending slot therethrough adjacent each said scale, means to adjust said second drum manually about its axis to bring a selected scale and its adjacent slot into registry with said aperture, and drive means connected to an actuating member to rotate said first drum through a predetermined angle in response to a measurable stimulus originating from said actuating member when actuated, whereby said stimulus may be measured by observing said indicia against the selected one of said scales, through its adjacent slot, and through said aperture.

8. A gauge for measuring stimuli comprising a casing, a first rotary drum mounted therein having indicating indicia on the outer surface thereof, said casing having an elongate aperture therein extending axially of said drum and a scale disposed along one axially-extending edge of said aperture, a second rotary drum mounted around said first drum coaxially therewith and manually adjustable relative thereto about its axis and interposed between said first drum and said casing, said second drum having a plurality of differently graduated scales extending axially thereof and spaced from one another angularly about the axis of said drums, said second drum having an axially extending slot adjacent each of its scales, drive means connected to an actuating member to rotate said first drum through a predetermined angle in response to a measurable stimulus originating from said actuating member, and means to adjust said second drum manually to bring a selected one of its scales and the slot adjacent thereto into registry with said aperture, whereby said stimulus may be measured on said selected scale by observing said indicia against said selected scale through the aperture in said casing and through the slot in said outer drum adjacent said selected scale, and by observing said indicia against the scale along the edge of said aperture.

References Cited in the file of this patent

UNITED STATES PATENTS 2,798,454   Gleeson _____ July 9, 1957

FOREIGN PATENTS 21,261   Great Britain _____ Feb. 7, 1935